(12) United States Patent
Bullock et al.

(10) Patent No.: US 7,134,819 B2
(45) Date of Patent: Nov. 14, 2006

(54) TIE-DOWN ASSEMBLY

(75) Inventors: Charles Bullock, Waukegan, IL (US); William S. Hansen, II, Waukegan, IL (US)

(73) Assignee: A.L. Hansen Manufacturing Co., Waukegan, IL (US)

( * ) Notice: Subject to any disclaimer, the term of this patent is extended or adjusted under 35 U.S.C. 154(b) by 39 days.

(21) Appl. No.: 11/017,520

(22) Filed: Dec. 20, 2004

(65) Prior Publication Data

US 2006/0133907 A1     Jun. 22, 2006

(51) Int. Cl.
*B60P 7/08*     (2006.01)

(52) U.S. Cl. ............... 410/102; 410/106; 410/107; 410/111; 410/112

(58) Field of Classification Search ............. 410/102, 410/106–116; 24/265 CD, 115 K; 248/499
See application file for complete search history.

(56) References Cited

U.S. PATENT DOCUMENTS

| | | | |
|---|---|---|---|
| 2,756,693 A | 7/1956 | Frost | |
| 3,021,799 A | 2/1962 | Oakley | |
| 3,300,171 A | 1/1967 | Watts | |
| 3,377,039 A * | 4/1968 | Hayes | .................. 410/112 |
| 3,831,532 A | 8/1974 | Smith et al. | |
| 3,893,399 A | 7/1975 | Lewis et al. | |
| 4,592,686 A | 6/1986 | Andrews | |
| 4,907,921 A | 3/1990 | Akright | |
| 5,052,869 A | 10/1991 | Hansen, II | |
| 5,180,263 A * | 1/1993 | Flowers, Jr. | ................ 410/106 |
| 5,330,300 A | 7/1994 | Jones et al. | |
| 5,586,801 A | 12/1996 | Sawyer et al. | |
| 6,030,159 A | 2/2000 | Herrick et al. | |
| 6,050,763 A | 4/2000 | Swailes | |
| 6,065,917 A | 5/2000 | Shambeau et al. | |
| 6,138,975 A | 10/2000 | McDaid | |
| 6,142,718 A * | 11/2000 | Kroll | ......................... 410/106 |
| 6,161,883 A | 12/2000 | Pearl | |
| 6,213,696 B1 | 4/2001 | Austin | |
| 6,764,259 B1 | 7/2004 | Preta | |
| 6,918,721 B1 * | 7/2005 | Venton-Walters et al. | .. 410/102 |

OTHER PUBLICATIONS

A.L. Hansen Commercial & Industrial Hardware, pp. 121 and 122, prior to Aug. 1990.
Austin Suppliers of Industrial, Vehicle and Commercial Hardware, pp. 314-319, prior to Aug. 1990.
BPC Buyers Products Co., 1984 Catalog, p. 61, prior to Aug. 1990.

* cited by examiner

*Primary Examiner*—Stephen Gordon
(74) *Attorney, Agent, or Firm*—Brinks Hofer Gilson & Lione

(57) ABSTRACT

A tie-down assembly includes a housing configured to receive a pair of bails. A cross-bar and post are used to rotatably connect the bails to the housing. The pair of bails can be identical to allow a strap to be cinched to the housing. Alternatively, the bails can be shaped differently, for example, to center a strap within the bail or to facilitate the use of multiple straps.

21 Claims, 2 Drawing Sheets

TIE-DOWN ASSEMBLY

TECHNICAL FIELD

The present invention relates to a tie-down assembly of the type used to secure tie-down ropes or straps in place, for example, inside an automobile such as a truck.

BACKGROUND INFORMATION

Tie-down assemblies have been used for some time to secure freight transported in vehicles. Tie-down assemblies are firmly mounted inside a vehicle, such as a truck, ship, or container. As needed, straps, ropes, or lines are then fastened to the tie-down assemblies to hold freight in a desired location or position.

In the past, several types of tie-down assemblies have reached widespread acceptance. A first approach uses a D-ring formed of circular cross-section, heavy gauge wire. The D-ring is pivotably mounted within a U-channel that is in turn welded in place. This tie-down assembly does not allow the channel to rotate in use, and welding operations are required to mount the assembly in place. Two examples of this approach are identified as lashing rings B40 and B50 as distributed by the Buyers Products Company.

A second approach is to provide a sheet metal bracket that surrounds a D-ring at least partially. The bracket is in turn secured in place, as for example with threaded fasteners. This approach provides a light weight, low cost design. Examples of this type of tie-down assembly are shown in U.S. Pat. No. 4,907,921, assigned to the assignee of the present invention, and cargo tie-down models 39F and 300F of the A. L. Hansen Mfg. Co.

A third approach is to provide a metal cup that defines a recess in which a cross-bar is pivotably mounted with a threaded fastener that defines a pivot axis. The cross-bar defines a stud at each end, and a rectangular section bail is mounted onto these studs. An example of this approach is shown as model 10-40 of A. L. Hansen Mfg. Co. This approach requires a threaded fastener to secure the cross-bar in place.

A fourth approach utilizes a ring to which is secured an axle that passes through a mounting post. An example of this approach is shown as model CAT-340 of Austin Hardware.

A fifth approach utilizes a mounting plate and a cross-bar. The cross-bar defines an integral post and two opposed recesses that receive ends of a tie-down bail. The integral post passes through a bearing washer and a central opening in the central panel and defines an enlarged head that secures the tie-down assembly together. This approach is described in U.S. Pat. No. 5,052,869, which is incorporated by reference herein, is titled "Tie Down Assembly," and is assigned to A.L. Hansen Mfg. Co.

BRIEF SUMMARY

The various preferred embodiments provide significant improvements and advantages over previously known tie-down assemblies. According to a first aspect of the invention, a tie-down assembly is provided. The tie-down assembly includes a housing configured to receive a pair of bails. A cross-bar and post are used to rotatably connect the bails to the housing. The pair of bails can be identical or have different geometries. Exemplary geometries include an archoidal or D-shape, and a trapezoidal shape.

The foregoing paragraph has been provided by way of general introduction, and is not intended to limit the scope of the following claims. The presently preferred embodiments, together with further advantages will be best understood by reference to the following detailed description taken in conjunction with the accompanying drawings.

BRIEF DESCRIPTION OF THE DRAWINGS

Embodiments of the present invention will now be described by way of example with reference to the accompanying drawings, in which.

DETAILED DESCRIPTION OF THE DRAWINGS AND THE PRESENTLY PREFERRED EMBODIMENTS

Figure 1:
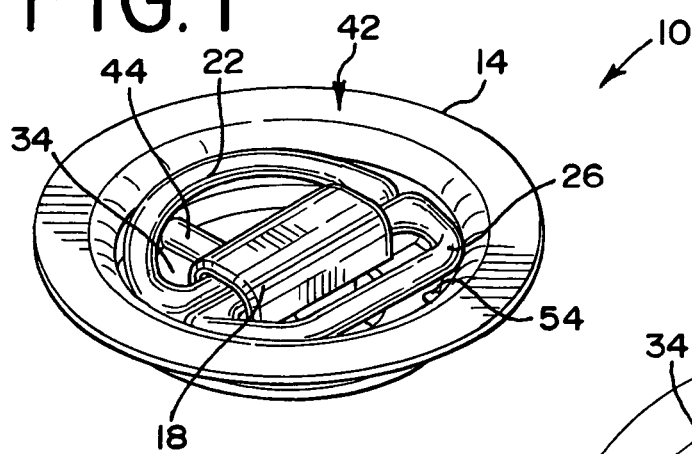
FIG. 1 illustrates a perspective side view of an exemplary tie-down assembly having two bails.

The invention is described with reference to the drawings in which like elements are referred to by like numerals. The relationship and functioning of the various elements of this invention are better understood by the following detailed description. However, the embodiments of this invention as described below are by way of example only, and the invention is not limited to the embodiments illustrated in the drawings. It should also be understood that the drawings are not to scale and in certain instances details have been omitted, which are not necessary for an understanding of the present invention, such as conventional details of fabrication and assembly.

Referring to the drawings, FIGS. 1–6 illustrate a first embodiment of the present invention, and in particular, a tie-down assembly 10. Generally, tie-down assembly 10 includes a housing 14, a channel-shaped cross-bar 18, bails 22 and 26, and post 30. One end of the post is secured to the cross-bar, and the other end of the post extends through a central opening in the housing. The ends of the bails are disposed through the channel formed by the cross-bar, and thus are rotatably attached to the housing.

Figure 2:
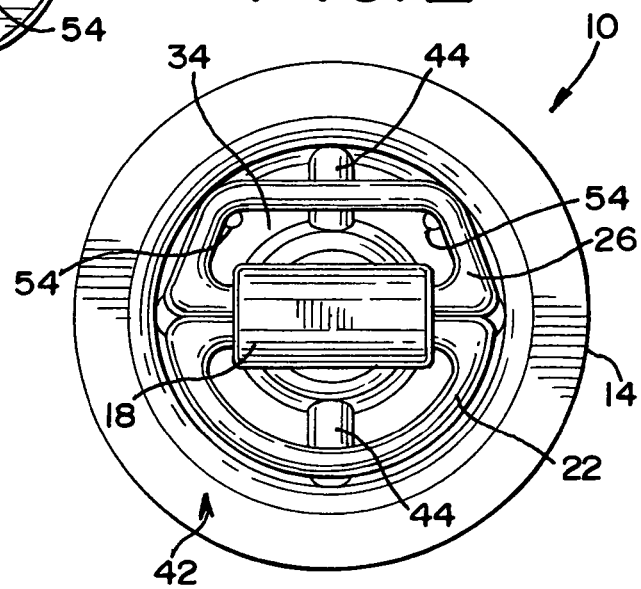
FIG. 2 illustrates a plan view of an exemplary tie-down assembly having two bails.
Figure 3:
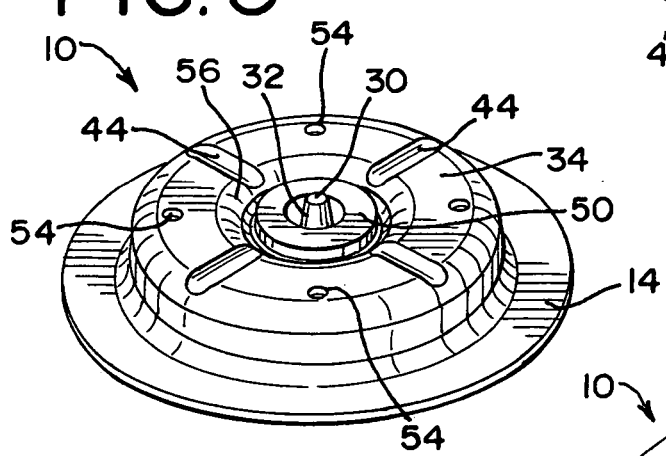
FIG. 3 illustrates a perspective rear view of an exemplary tie-down assembly having two bails.
Figure 4:
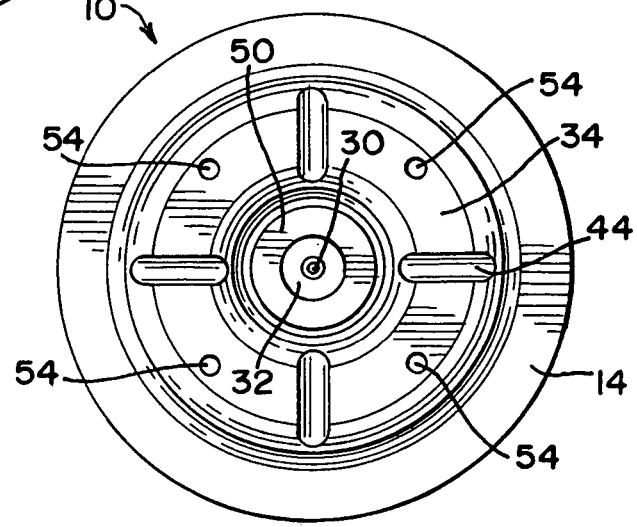
FIG. 4 illustrates a rear view of an exemplary tie-down assembly having two bails.

As illustrated in FIGS. 1–2, housing 14 is a cup-shaped member having a bottom plate 34 and a peripheral flange 42. Bottom plate 34 is recessed relative to flange 42 to form an interior portion of housing 14. The interior portion is sized so as to receive bails 22 and 26. Accordingly, bails 22 and 26 are set flush with the flange and out of the way when the tie-down assembly is not in use. As best illustrated in FIG. 3, openings 54 are provided through bottom plate 34. Bolts or any other suitable fixing device can be disposed through openings 54 to mount the housing to a desired mounting surface. For example, the housing can be mounted to an interior side panel on an automobile, a truck bed, a boat, or an airplane. Alternatively, the housing can be mounted to a floor, ceiling, or wall surface in a building. Ribs 44 are provided on bottom plate 34 to act as stiffeners and to reinforce housing 14. Recess 56, which is described in greater detail below, is also provided on bottom plate 34.

As illustrated in FIGS. 1–2 and 5–8, cross-bar 18 is used to rotatably secure bails 22 and 26 to housing 14. Cross-bar 18 is provided with a channel-shaped recess sufficiently large to receive the ends of bails 22 and 26. The channel allows the bails to rotate into and away from interior recess of the housing.

Figure 5:
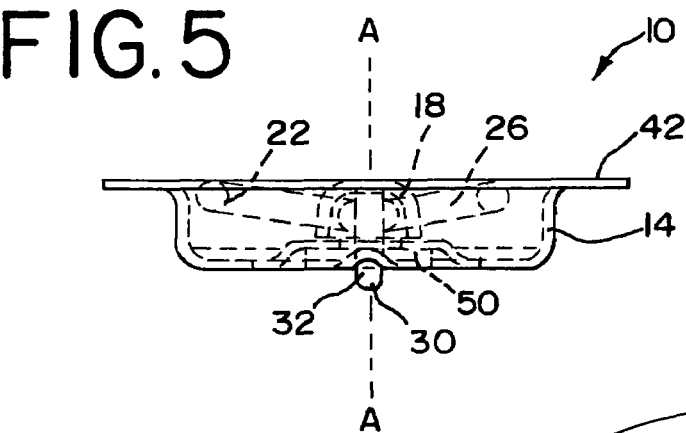
FIG. 5 illustrates a cross-section side view of an exemplary tie-down assembly having two bails.
Figure 6:
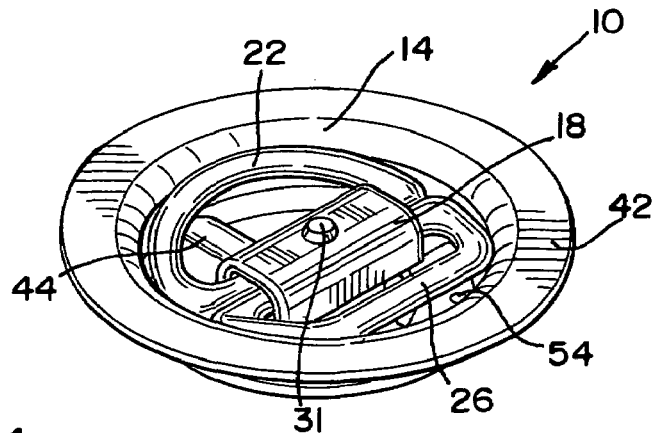
FIG. 6 illustrates a perspective side view of an exemplary tie-down assembly having two bails.
Figure 7:
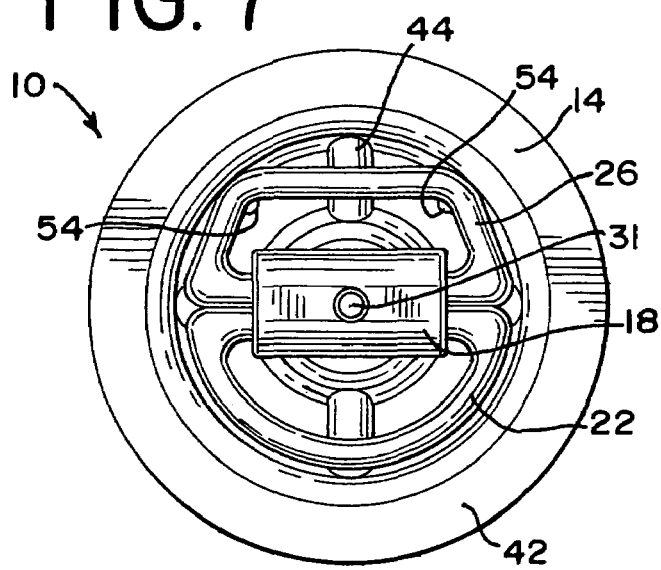
FIG. 7 illustrates a plan view of an exemplary tie-down assembly having two bails.
Figure 8:
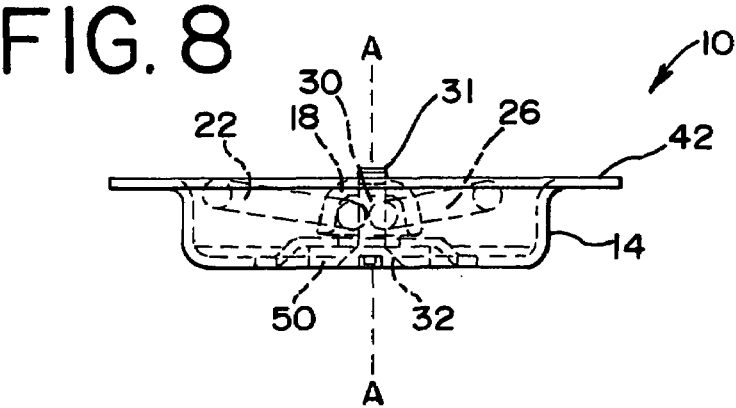
FIG. 8 illustrates a cross-section side view of an exemplary tie-down assembly having two bails.

Cross bar 18 is secured to housing 14 by post 30. Post 30 can be formed integrally with cross-bar 18, as shown in FIG. 5. When post 30 is formed integrally with cross-bar, end 31 of post 30 is welded or forged to a central region of cross-bar 18. Alternatively, an opening can be provided through cross-bar 18 so that end 31 of post 30 can be secured to cross-bar 18, as shown in FIG. 6. In the embodiment shown in FIG. 6, end 31 of post 30 is deformed or welded to secure the post to the cross-bar.

As illustrated in FIGS. 3–5 and 8, end 32 of post 30 extends through a central opening in plate 34 of housing 14. Recess 56, illustrated in FIG. 3, is provided so that end 32 does not protrude from plate 34. End 32 of post 30 is secured to housing 14 by welding or upsetting end 32 of post 30 to bearing washer 50. As a result, the post, the cross-bar, and the bails freely rotate about axis A shown in FIGS. 5 and 8.

As illustrated in FIGS. 1–2 and 7–8, two bails are provided in the tie-down assembly. The tie-down bails can be used either individually or cooperatively. For example, both bails can be used in combination to secure freight by passing a strap through the first and second bail openings and then cinching the strap back through the first bail opening. As such, the strap does not need to be knotted, as with conventional single-bail tie-downs.

As illustrated in FIGS. 1–2 and 7–8, bail 22 is D-shaped, while bail 26 is shaped as a bi-laterally symmetrical trapezoid. This bail geometry facilitates access to each individual bail, in particular, when multiple straps are necessary. In addition, such bail geometry can provide more secure cinching compared to the use of identical bails.

The embodiments described above and shown herein are illustrative and not restrictive. The scope of the invention is indicated by the claims rather than by the foregoing description and attached drawings. The invention may be embodied in other specific forms without departing from the spirit of the invention. For example, the bails can be forged or cast in any number of materials, shapes and sizes. The bails can be provided with a round cross-section, or a cross-section of any suitable shape. Alternatively, three or more bails can be provided with the tie-down assembly, depending on the overall size of the housing, the cross-bar, and the post. The shape and structure of the housing can also be changed as necessary for various applications. For example, a square housing can alternatively be provided so as to fit within a square opening. Additionally, the mounting openings can be formed on the flange rather than the bottom plate. Accordingly, these and other changes which come within the scope of the claims are intended to be embraced herein.

What is claimed is:

1. A tie-down assembly, comprising:
   a housing;
   a cross-bar;
   first and second bails each having a portion disposed between the cross-bar and the housing; and
   a post rotatably connecting the cross-bar and the housing, wherein the first and second bails are movably connected to the housing by the cross-bar and the post.

2. The tie-down assembly of claim 1, wherein the first bail has a different shape than the second bail.

3. The tie-down assembly of claim 2, wherein the first bail is curved.

4. The tie-down assembly of claim 3, wherein the first bail is arcuate.

5. The tie-down assembly of claim 3, wherein the second bail is curved.

6. The tie-down assembly of claim 2, wherein the second bail has a flattened portion.

7. The tie-down assembly of claim 3, wherein the second bail is square.

8. The tie-down assembly of claim 3, wherein the second bail is rectangular.

9. The tie-down assembly of claim 3, wherein the second bail is trapezoidal.

10. The tie-down assembly of claim 2, wherein the cross-bar has an opening therethrough and the post extends through the opening.

11. The tie-down assembly of claim 10, wherein a portion of the post is deformed, thereby securing the post to the cross-bar.

12. The tie-down assembly of claim 10, wherein the post is welded to the cross-bar.

13. The tie-down assembly of claim 1, wherein the housing comprises a recessed portion adapted to receive the first and second bails.

14. A tie-down assembly, comprising:
    a housing;
    a cross-bar having an opening;
    a first bail having a portion disposed between the housing and the cross-bar, the first bail having a curved portion;
    a second bail having a portion disposed between the housing and the cross-bar, the second bail having a flattened portion;
    a post rotatably connecting the housing and the cross-bar, a first portion of the post being disposed through the opening of the cross-bar, a second portion of the post being secured to the housing, wherein the first bail and the second bail are movably connected to the housing by the cross-bar and the post.

15. The tie-down assembly of claim 14, wherein the housing comprises a recessed portion adapted to receive the first and second bails.

16. The tie-down assembly of claim 14, wherein the first bail is arcuate.

17. The tie-down assembly of claim 16, wherein the second bail is trapezoidal.

18. The tie-down assembly of claim 14, wherein the second bail is square.

19. The tie-down assembly of claim 14, wherein the second bail is rectangular.

20. The tie-down assembly of claim 14, wherein the second bail is trapezoidal.

21. A method of securing cargo, comprising:
    a) providing a tie-down assembly comprising:
       a housing;
       a cross-bar;
       first and second bails each having a portion disposed between the cross-bar and the housing; and
       a post rotatably connecting the cross-bar and the housing,
       wherein the first bail and the second bail are movably connected to the housing by the cross-bar and the post;
    b) providing a strap;
    c) inserting the strap through the first and second bails;
    d) cinching the strap, thereby securing the cargo.

\* \* \* \* \*